United States Patent [19]

Henderson et al.

[11] 4,038,509
[45] July 26, 1977

[54] ORBITAL WELDING APPARATUS

[75] Inventors: Leslie Henderson, Whitley Bay, England; Thomas Bentham Hemsley, deceased, late of Monkseaton, England, by Vera Hemsley, executrix

[73] Assignee: Clarke Chapman Limited, Gateshead, England

[21] Appl. No.: 618,979

[22] Filed: Oct. 2, 1975

[51] Int. Cl.² ............................................. B23K 9/02
[52] U.S. Cl. ................................... 219/60 A; 219/130
[58] Field of Search ................. 219/60 A, 124, 125 R, 219/125 PL, 130

[56] References Cited

U.S. PATENT DOCUMENTS

| | | | |
|---|---|---|---|
| 3,400,237 | 9/1968 | Kazlauskas | 219/60 A |
| 3,409,752 | 11/1968 | Henderson et al. | 219/60 A |
| 3,560,696 | 2/1971 | Grinenko et al. | 219/60 A |
| 3,688,069 | 8/1972 | Kazlauskas | 219/60 A |
| 3,873,798 | 3/1975 | Friedman et al. | 219/60 A |

Primary Examiner—Bruce A. Reynolds
Assistant Examiner—N. D. Herkamp

[57] ABSTRACT

Orbital welding apparatus in which wire is fed to the welding zone by wire feed mechanism operable by differential rotation of two one-piece U-shape drive members operable at different speeds, one member carrying a welding electrode and the wire feed mechanism. Both drive members have openings allowing entry of tube to be welded. The apparatus permits orbital welding of very closely spaced tubes without using a wire feed drive motor mounted on the rotatable assembly. Both TIG or MIG arc welding methods may be performed by the invention, or any method involving the feeding of wire into the weld zone.

4 Claims, 10 Drawing Figures

ORBITAL WELDING APPARATUS

The invention relates to orbital welding apparatus for tubes and pipes in which they are welded with their ends abutting, the tubes or pipes not being rotated.

BACKGROUND OF THE INVENTION

Orbital welding apparatus is known for: (a) butt welding of tubes using autogenous tungsten inert gas (TIG) welding; such apparatus is exemplified by U.S. Pat. Nos. 2,721,248; 3,035,147; 3,230,340; 3,238,347; 3,395,262; 3,534,199; 3,649,799; 3,780,254; and 3,823,298, and (b) butt welding of tubes using TIG welding with the addition of filler wire as exemplified by U.S. Pat. Nos. 3,409,752 (assigned to the assignee of the present applicant); 3,584,185; 3,780,254; and 3,838,244.

In all cases, in the prior proposals just mentioned, the apparatus is disclosed as having one or more of the following features:
  a. overall dimensions radially of the tubes to be welded equal to several times the diameter of the tubes;
  b. a housing which must be opened to allow the entry of tube to be welded; the overall opened dimensions radially of the tube is several times (at least) the diameter of the tubes when the housing is opened;
  c. suitability for only very small diameter tubes;
  d. ability to perform only autogenous welds without filler wire or without any feed or wire.

None of the examples of prior proposals for orbital welding apparatus mentioned above shows means for positive feeding of wire into the weld zone using mechanism requiring very small clearance radially of the tube to be welded; for example a clearance such that tube spacing may be as small as about 1.75 inches for tubes of 1½ inches outside diameter.

None of the prior art examples is suitable for boiler tube welding in manufacture of boiler tube assemblies; and in the repair of damaged sections of existing boiler tube. In both cases closely adjacent tubes make it imperative that the apparatus have very small clearance requirements and be capable of being offered up to the tubes at one side thereof without the need for opening up a "head" which increases the clearance needed. The feeding of wire for either TIG or metal inert gas (MIG) welding is also essential in boiler tube welding, especially in nuclear power applications.

OBJECTS OF THE INVENTION

An object of the invention is to provide orbital welding apparatus in which the shortcomings of the prior proposals are eliminated or reduced to an extent such that they may be ignored.

A further object is to provide orbital welding apparatus in which the facility to feed wire to the weld zone is provided combined with a minimal clearance requirement radially of the tubes to be welded.

BRIEF SUMMARY OF THE INVENTION

These and other objects of the invention are achieved by orbital welding apparatus employing means to feed wire to the weld zone wherein the feeding mechanism is operable by relative rotation of two drive members each separately rotated by its own drive means. One of the drive members carries both the welding electrode and the wire feed means. Both drive members have openings allowing entry of the tube to be welded. The apparatus is constructed so as to be capable of welding tubes even when closely spaced to adjacent tubes. Other features and advantages will be found in the detailed description that follows.

DESCRIPTION OF PREFERRED EMBODIMENT

Figure 1:
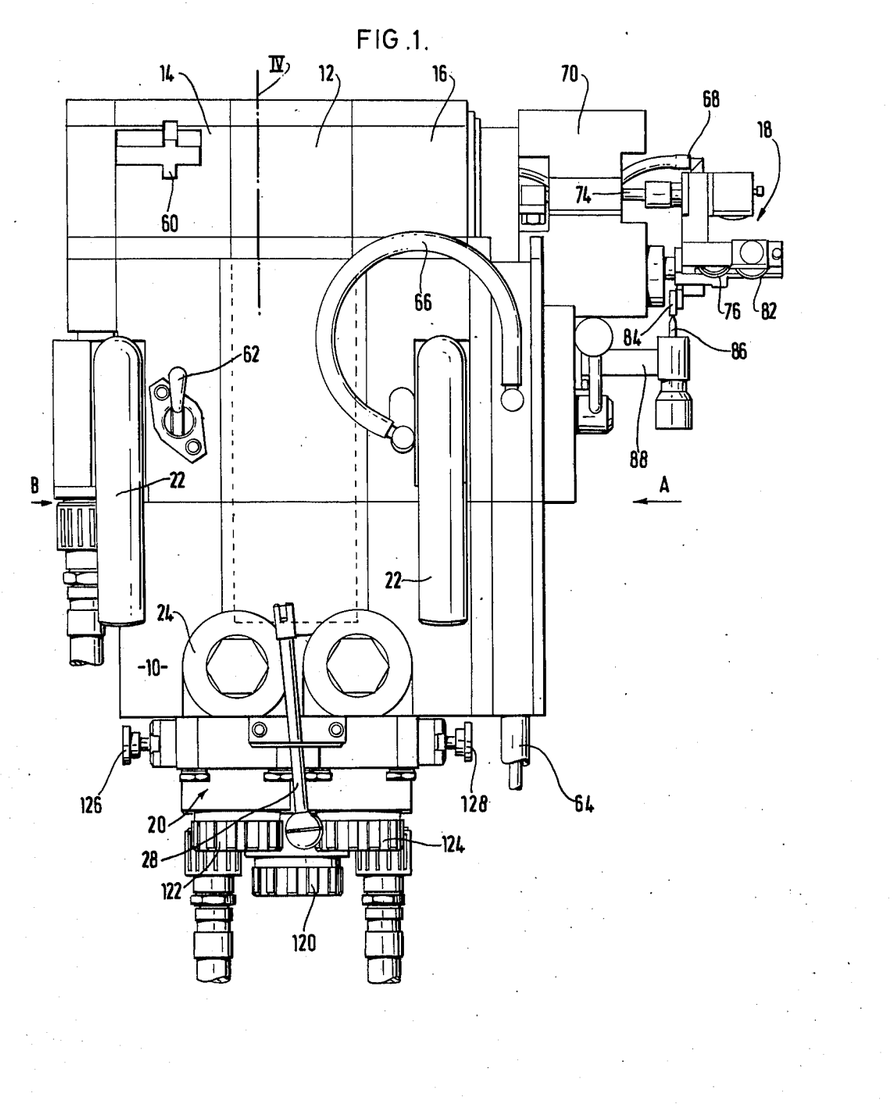
FIG. 1 is a front elevation of a first embodiment of apparatus in accordance with the invention.
Figure 2:
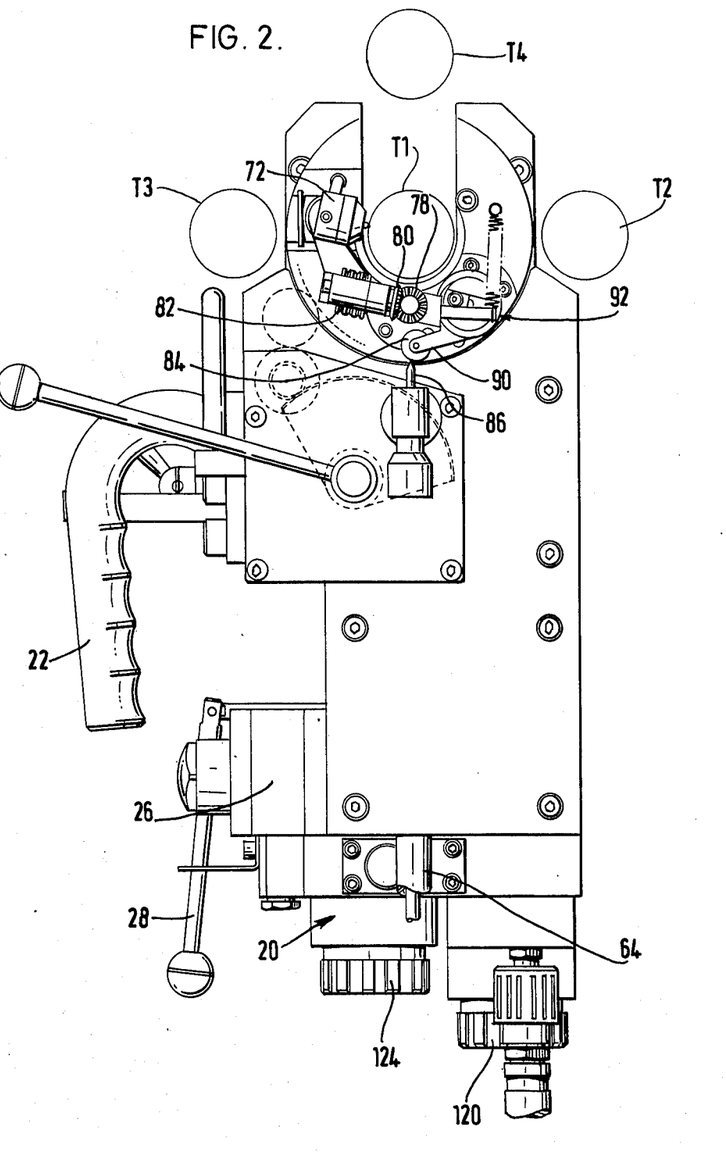
FIGS. 2 and 3 are end elevations looking in the directions of arrows A and B respectively in FIG. 1.
Figure 3:
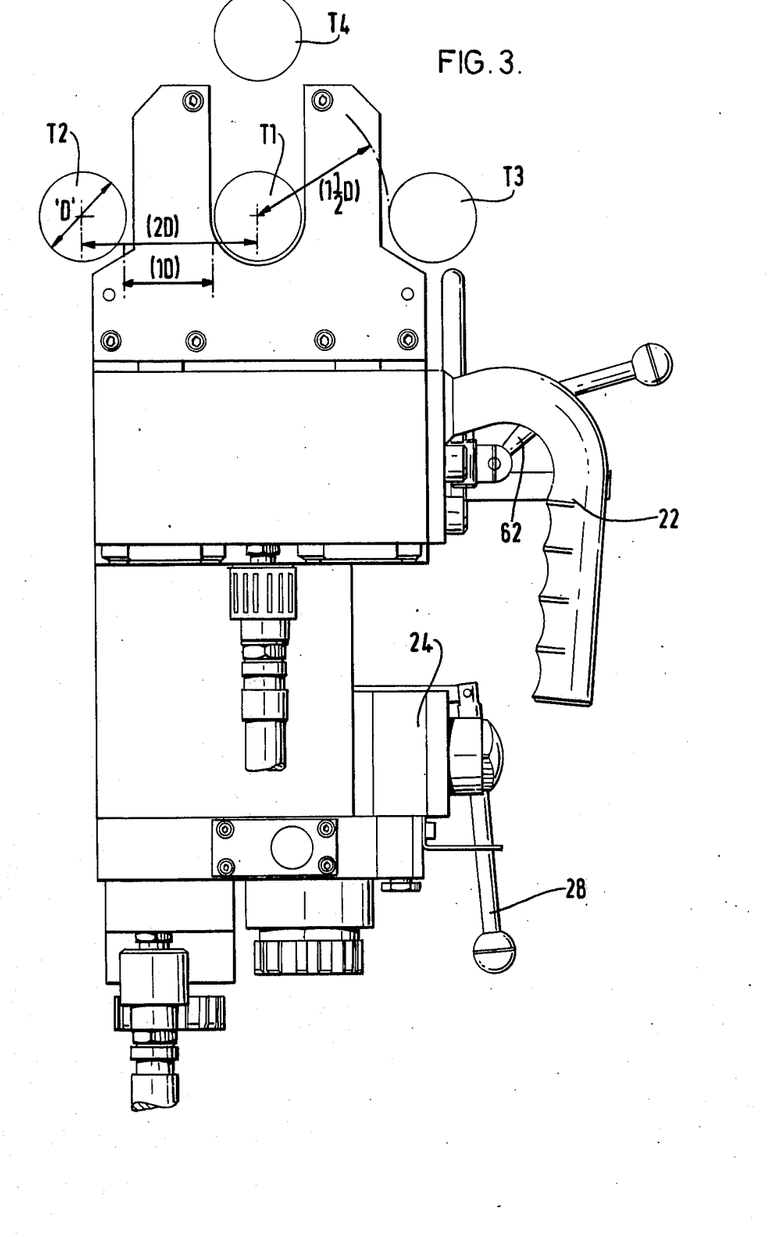

FIGS. 1, 2 and 3 show welding apparatus of portable type intended for on-site use particularly in power station work for making orbital welds between lengths of tubing by TIG welding with the addition of filler wire.

Pipe which is commonly required to be welded in power station work for example, is of 3.81 centimeters (1.50 inches) outside diameter and the apparatus to be described is typically designed to weld such tubing even where the nearest points of adjacent lengths of tubing are spaced only one diameter 3.81 cm away: that is, the longitudinal central axes of those lengths of tubing are located at 7.62 cm (3 inch) pitching.

FIG. 3 shows such a situation, in which the apparatus is shown in position for welding tubing T1 in the presence of lengths of tubing T2, T3 and T4 spaced from tubing T1 by a distance of only one diameter.

For convenience and successful welding in such conditions the welding apparatus must be capable of being offered up to the work from one side, and of performing of weld completely without any moving part protruding outside a radius determined by the nearest point of adjacent tubing, i.e., all moving parts must orbit within a radius of 1½ times the outside diameter of the tubing.

The apparatus described below meets this requirement though it is suitable also for other applications.

The apparatus has the following main sections: primary and secondary gearboxes 10, 12; clamp section 14; gas seal and slipring section 16; welding head 18; and motor control valve section 20.

The apparatus has two handles 22.

PRIMARY GEARBOX 10

Two air motors 24, 26 are each connected to two reduction gear stages (not shown) each of which is a worm and wormwheel. The output shafts of the two final reduction gear stages are aligned are extend parallel to the tubing T1.

SECONDARY GEARBOX 12

Figure 4:
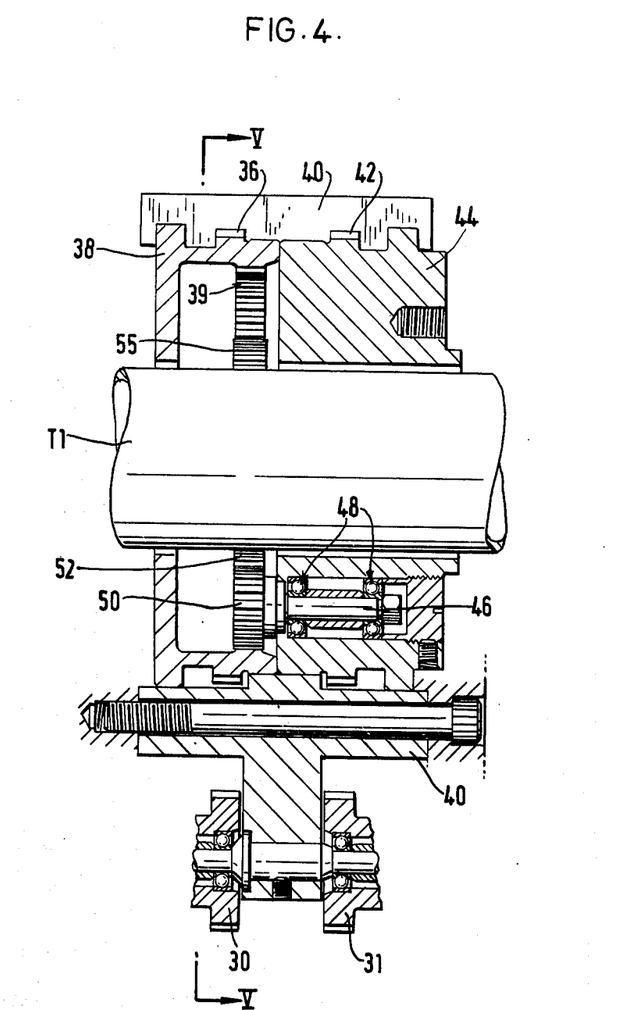
FIGS. 4 and 5 are sections on the lines IV - IV in FIG. 5 and V — V in FIG. 4 respectively, FIG. 4 being a part vertical section approximately in the plane indicated at IV in FIG. 1.
Figure 5:
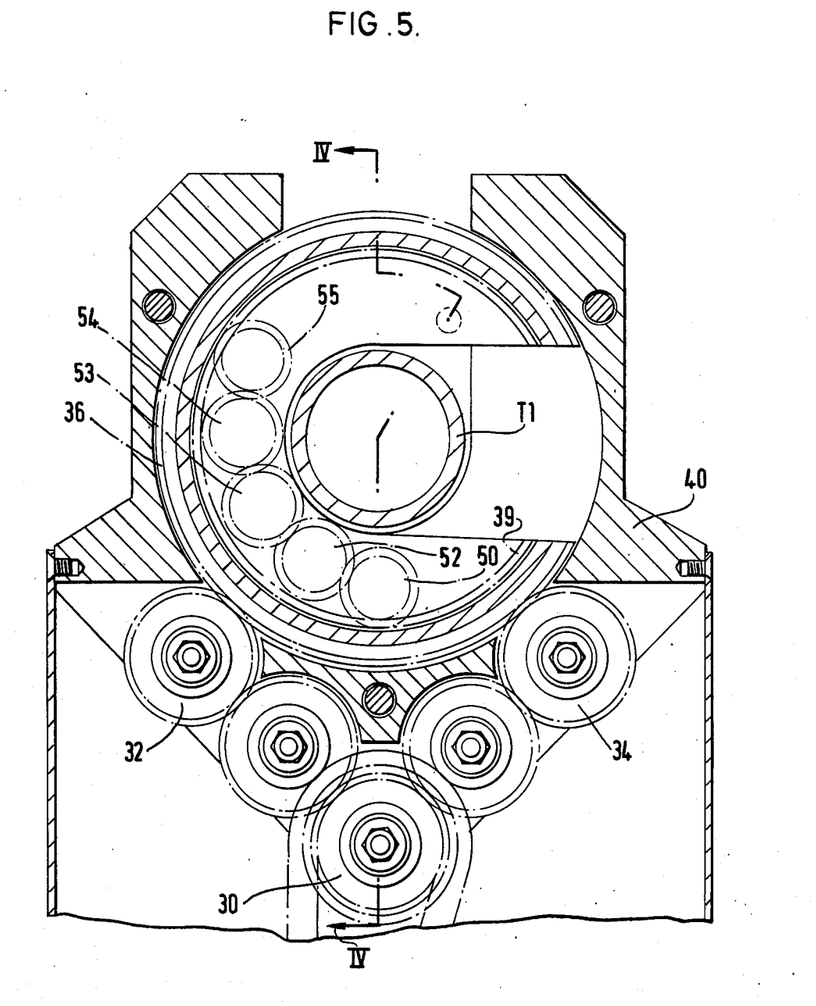

The final output shaft driven by the motor 24 is connected through a clutch (not shown) operable by a handle 28 and gearing (not shown) to a central gearwheel 30 of a first array of five intermeshing gearwheels (FIG. 5). The final output shaft driven by the motor 26 is connected through gearing (not shown) to a central gearwheel 31 (FIG. 4) of a second array of five intermeshing gearwheels (not otherwise shown).

The two end gearwheels 32, 34 of the first array of gearwheels mesh with outer teeth 36 formed on a drive member 38 (FIGS. 4 and 5) in the form of a generally U-shaped spur gear. The drive member 38 also has internal teeth 39. The two arrays of gearwheels are mounted on shafts journalled in a casing 40, which is also generally of U-shape within which the drive member 38 is located. The two-end gearwheels of the second array of five gearwheels mesh with outer teeth 42 on another drive member 44 (FIG. 4) also in the form of a generally U-shaped spur gear located in the casing 40 and bearing against the drive member 38. The drive member 44 carries shafts 46 mounted in ball bearings 48 and carrying a train of five intermeshing pinions 50, 52, 53, 54 and 55. The end pinions 50 and 55 also mesh with the internal teeth 39 of the drive member 38.

The two array of five gearwheels are so arranged that, in either case, one end gearwheel comes back into mesh before the other end gearwheel disengages from the associated drive member so that the continuity of drive is ensured despite the opening in the side of each U-shaped drive member. The train of five gearwheels 50 – 55 ensures continuity of drive in similar manner to the gearwheel 54 upon relative rotation of the drive members 38, 44 regardless of their relative angular orientation and despite the openings in their sides. The gearwheel 54 is connected to a shaft (not shown) extending through the gas seal and slipring section 16 parallel to the axis of the tubing T1 to the welding head section 18 described below. The mechanism here described, wherein the gear train 50 – 55 is mounted on the second drive member 44 and whose end pinions 50, 55 are engaged to the first drive member 38, with the result that the gearwheel 54 rotation depends upon the difference in rotation speed of drive members 38, 44, is similar in principle to that described in the aforementioned, commonly-assigned U.S. Pat. No. 3,409,752, wherein this differential drive is used to actuate a wire feeder. Herein, gearwheel 54 is connected to bevel gear 78 (FIG. 2), which actuates the wire feeder.

CLAMP SECTION

Figure 6:
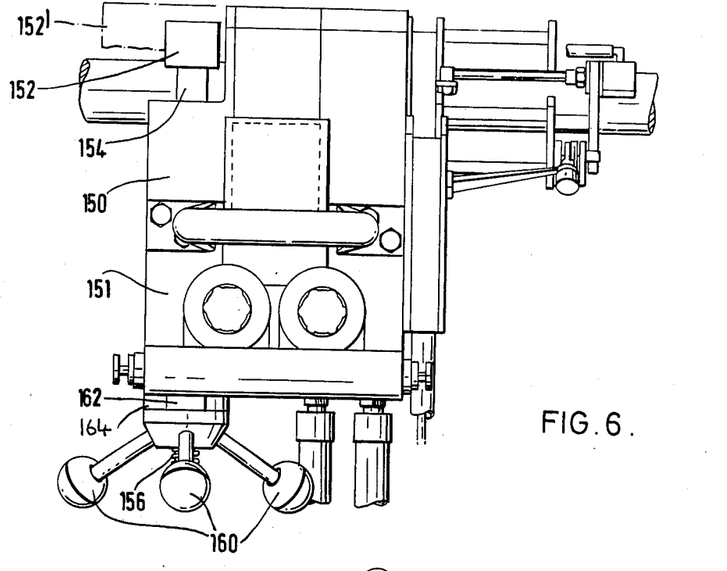
FIG. 6 is a diagrammatic side elevation of a first modified clamp for use in apparatus in accordance with the invention.
Figure 7:
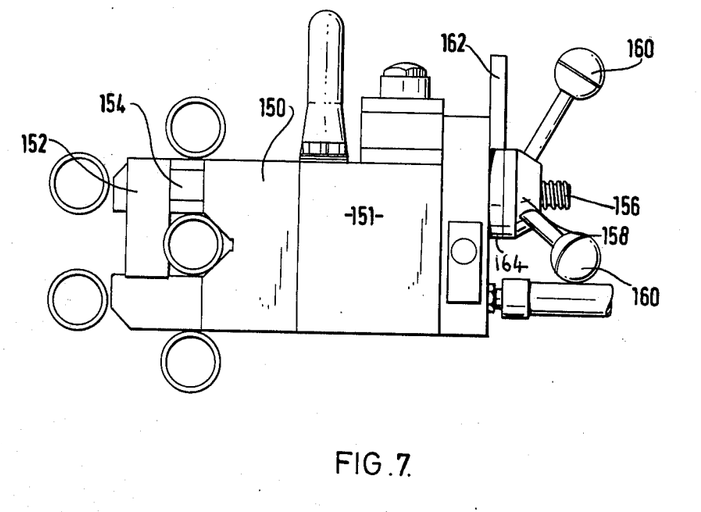
FIG. 7 is a diagrammatic end elevation of the form of apparatus shown in FIG. 6.

This is generally of U-shape being open at one side to allow entry of the tubing T1. The clamp proper consists of three self-centering jaws, one of which is shown at 60 (FIG. 1) operable pneumatically through a valve controlled by a lever 62. The clamp may be as shown in greater detail in FIGS. 6 and 7, and in FIG. 8.

In one modification (FIGS. 6 and 7) the clamp comprises a V-shaped jaw block 150 fixed to the body 151 of the apparatus and a movable jaw 152 projecting radially from a reciprocable rod 154. The rod 154 slides through the body 151 and has a screwed end portion 156 on which there is a nut 158. The nut 158 has handles 160. Another handle 162 extends from a collar 164 which cannot turn relative to the rod 156 but through which the rod 154 can move longitudinally. The clamps can be released by unscrewing the nut 158, the rod 154 moving endwise to the left in FIG. 7. The handle 162 can be turned through 90° to bring the jaw 152 to the position indicated at 152' in FIG. 6 so that the apparatus can be withdrawn from an array of tubes the jaw 152 now being able to pass between two adjacent tubes and removed from the tubes (or offered up to them) by virtue of the fact that the clamp is open at one side when the jaw 152 is in the turned positon.

Figure 8:
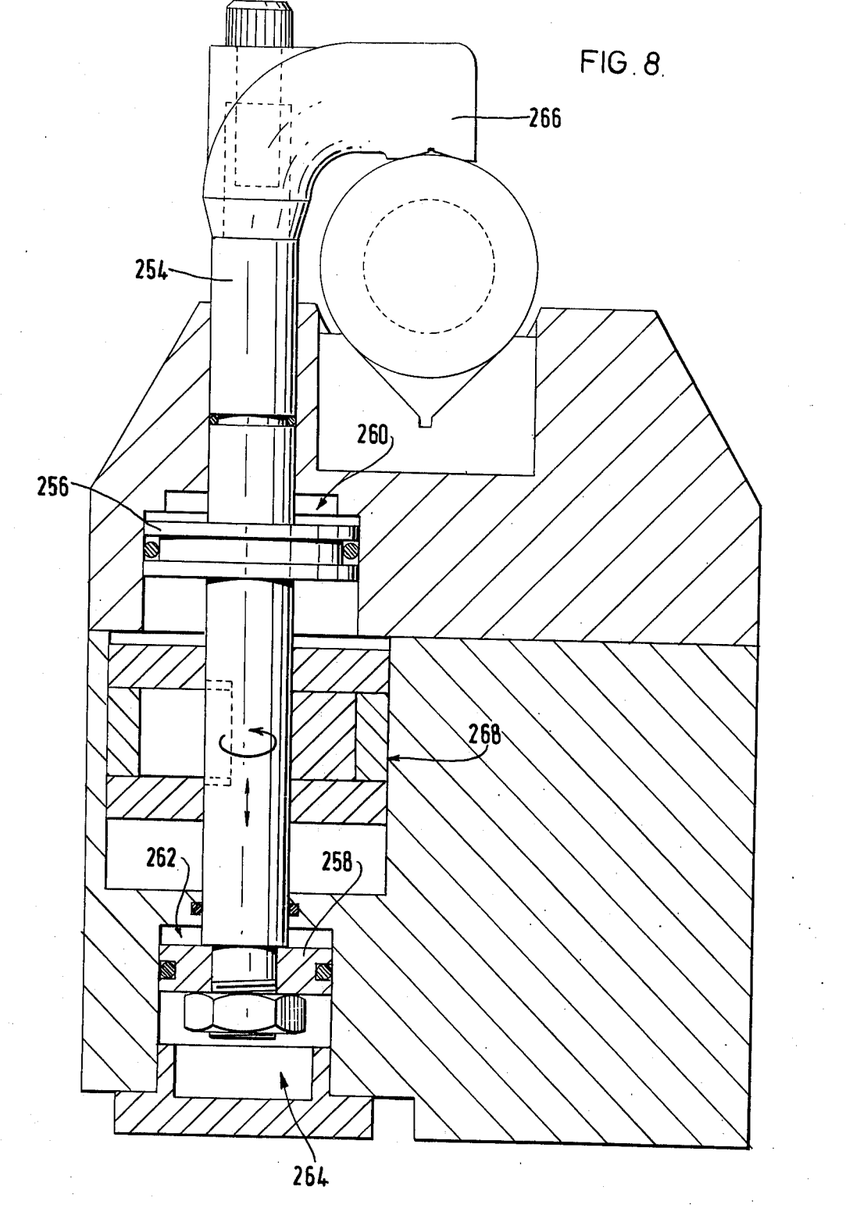
FIG. 8 is a diagrammatic end elevation of a second modified clamp for use in apparatus in accordance with the invention.

In another modification shown in FIG. 8, rod 254 is reciprocable by air pressure. The rod 254 has two pistons 256, 258 connected to it and air can be passed into the spaces 260, 262 to give additive forces for clamping and into space 264 to release the clamp. The rod 254 and the movable jaw 266 can be rotated by means of a pneumatic rotary piston device at 268 or by means of a rack engaging a pinion on the rod 254 and reciprocable by a pneumatic piston and cylinder device. It is preferred to provide rotary bearings (not shown) between the rod 254 and the pistons 256, 258 so that the pistons do not rotate with the rod.

GAS SEAL AND SLIP-RING SECTION 16

This section, also of general U-shape, ensures the supply of inert gas and welding current to the welding head from a stationary supply conduit 64 (FIGS. 1 and 2). Gas is fed from the conduit 64 through a tube 66 to the gas seal assembly and from there it passes through a tube 68 forming part of the welding head section 18.

Figure 9:
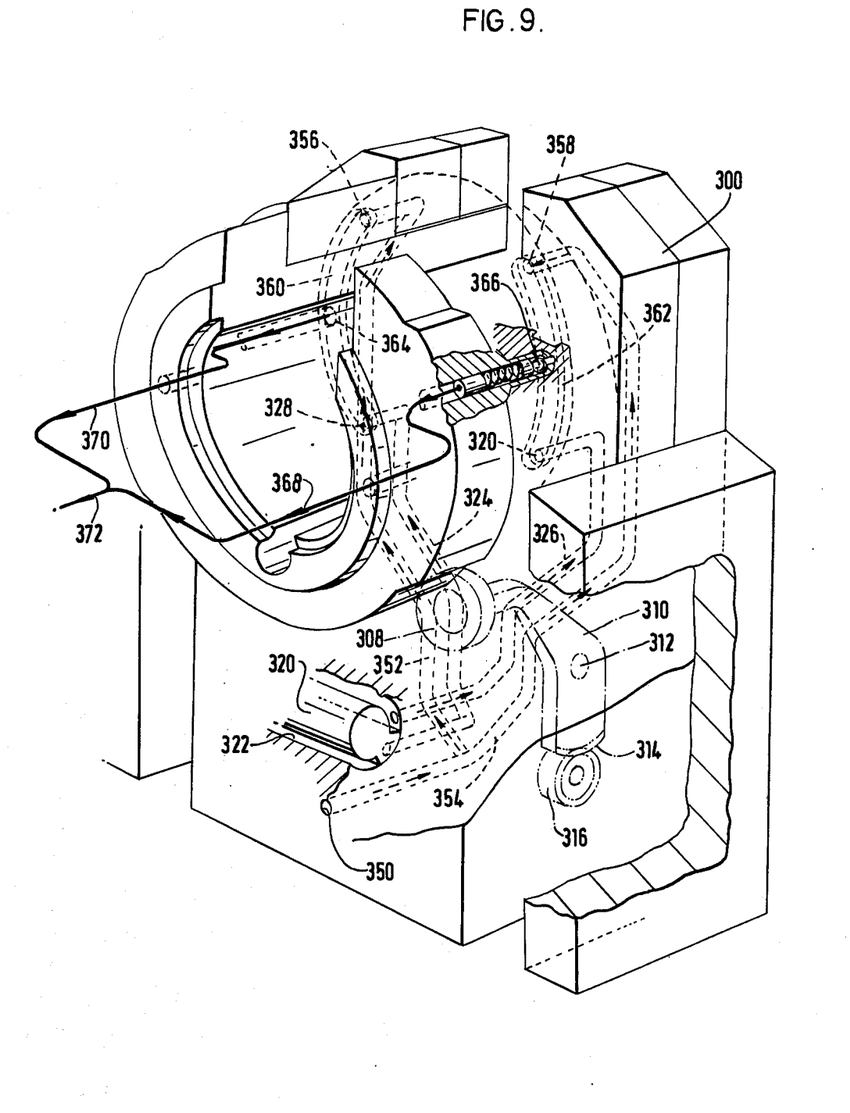
FIGS. 9 and 10 are three-dimensional views of a gas seal assembly for use in apparatus in accordance with the invention showing two different operating states.
Figure 10:
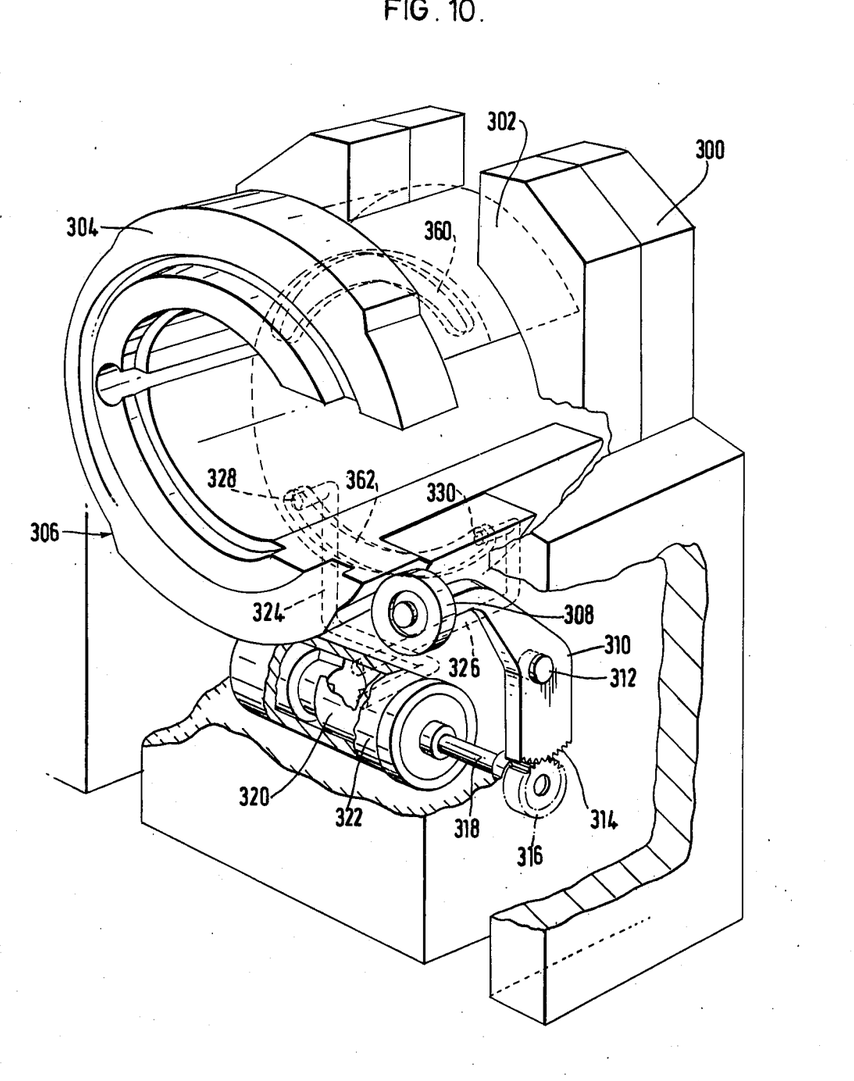

FIGS. 9 and 10 show diagrammatically one form of gas seal assembly by which gas is fed to the head from the fixed assembly. A stationary manifold 300 having an opening in one side presents a seal face 302 against which rotates a collector shoe 304. The shoe 304 has a peripheral cam profile 306 against which rolls a cam follower roller 308 carried on one end of an arm 310. The arm 301 is pivoted intermediate its ends on a fixed pivot 312 and at its other end has a toothed quadrant 314 meshing with a pinion 316. The pinion 316 is mounted on a shaft 318 connected to a rotary valve member 320 in a valve housing 322.

The valve housing has two outlets leading to passages 324, 326. The passages 324, 326 open at ports 328, 330 respectively in the seal face 302. The valve housing 322 has an inlet for inert shielding gas (not shown). An inlet port 350 leads to two passages 352, 354 which open at ports 356, 358 respectively, in the seal face 302. The port 350 is connected to a source of inert gas (not shown). The shoe 304 has in its face two equispaced arcuate collector parts 360, 362. Outlets from the ports 360, 362, lead via one way valves 364, 366, respectively, to outlet passages 368, 370, respectively, which are commoned in a passage 372 leading to the welding torch. The cam profile 306 is designed to ensure operation of the valve 320 in correct timed relationship with the movement of the two arcuate collector ports 360, 362 past the gas in the manifold 300. Inert purging gas is fed continuously to the passages 352, 354.

If the collector shoe 304 is assumed to be rotating clockwise in FIGS. 9 and 10 the position shown in FIG. 9 is such that shielding gas is passing through the valve 320 and the passage 326, into the port 362 and hence through the valve 366 and passages 368, 372 to the welding torch. The port 360 is just clearing the port 328 and the valve 320 shuts off the shielding gas source from the passage 324. Purging gas is entering the port 360 and, when the port 360 passes across the gap in the manifold 300, purge gas from the port 336 continues to prevent air from entering the port 360. Eventually the port 360 reaches the position shown in FIG. 10 when purge gas is fed to the port 360 from the port 358 as well as from the port 356. After the position is passed, purging gas continues to flow into the port 360 from the port 358.

In the position shown in FIG. 10 the valve 320 has changed over the shielding gas is fed through the passage 324 into the port 362 and so the torch through the passage 368. The valve 320 has closed off the passage 326.

FIGS. 9 and 10 are purely diagrammatic. The passages 368, 370, 372 and provided through the rotatable assembly to which the welding head is attached and in practice are defined by through apertures in a series of sub-components (not shown) which together make up the rotatable assembly.

The rotatable assembly includes a slip-ring assembly through which welding current from the combined conduit 64 (FIGS. 1 and 2) is fed to the welding head.

WELDING HEAD SECTION 18

This section is also generally of U-shape and comprises a U-shaped block 70 of Polytetrafluoroethylene plastics material which is connected through the gas seal and slip-ring section 16 to the drive member 44 in the secondary gearbox section 12 for rotation therewith about the axis of the tubing T1. A welding torch or electrode 72 is mounted on the block 70 and receives welding current from the slip-ring section 16 via a cable 74. A wire feed mechanism is also mounted on the block 70 and includes a drive roller 76 driven by bevel gears 78, 80 and cooperating with a grooved roller 82. The gear 78 is connected by the shaft referred to above to the gearwheel 54 of the secondary gearbox section 12. The welding torch 72 is displaceable transversely to the axis of the tubing T1 by the engagement of a roller 84 with an adjustable cam 86 mounted on an arm 88 fixed to the main stationary body of the apparatus. The roller 84 is carried by an arm 90 connected to a clutch mechanism 92 through which displacement of the roller 84 by the cam 86 swings the welding torch about the center of the bevel gear 78 to control weld formation at the end of a welding run. The block 70 also carries a spool for filler wire (not shown) which lies entirely within the projected area of the block. The filler wire is drawn off the spool by the rollers 76, 82 and fed to the weld zone adjacent the tip of the welding torch electrode.

MOTOR CONTROL VALVE SECTION 20

Three main control knobs for controlling the two air motors 24, 26; one knob 120 is an on/off valve control; knobs 122 and 124 are forward/reverse valve controls for the motors 24, 26 respectively, knob 122 being for filler wire speed control and knob 124 for welding head rotation speed control. The speeds of the motors 24, 26 are independently variable by control of air flow rate by flow regulators operable by knobs, 126, 128, respectively.

OPERATION

As can be seen clearly from the drawings the entire rotatable part of the apparatus lies within the cylindrical envelope of radius equal to 1½ times the diameter of the tubing T1. The apparatus can be offered up to the tubing T1 from one side only and clamped to the tubing. Gas and welding current are supplied to a fixed point on the apparatus and then fed to the welding head by the gas seal and slip-ring section.

The speed at which filler wire is fed to the weld zone is adjustable independently of the speed at which the welding torch orbits the tubing T1. When the speeds of the motors 24, 26 are equal to drive members 38, 44 rotate at the same speed and there is no rotation of the gearwheel 54 about it own center. The wire feed rollers 76, 82 therefore do not rotate about their centers. When the speed of the motor 24 is changed by the knob 122, a difference in speed in rotation of the drive members 38, 44 results and the gearwheel 54 rotates about its center as do the rollers 76, 82. The filler wire is then advanced to the weld zone at a speed which can be selected independently of the speed of rotation of the welding head about the tubing T1 as selected by the setting of the knob 124.

This manner of speed selection of wire feed is very important and the mechanism described above is very advantageous in the apparatus described because the absence of a wire feed drive motor on the welding head and the absence of otherwise bulky wire feed drive mechanism enables a very compact welding head to be realised.

The speed of wire feed can be progressively adjusted. This is very important during certain stages of welding, such as at the approach to the end of a welding run. The apparatus can be subject to automatic control by a programmed master controller. The above described wire feed control based upon the difference in rotational speed of the independently driven drive members 38 and 44 is the subject matter of the previously-referred to commonly-assigned U.S. Pat. No. 3,409,752. Reference is also made to the simultaneously filled, commonly-owned copending application, Ser. No. 615,983 for an illustration of the mounting of the wire-feed mechanism on the block 70.

The invention is not limited to application to portable apparatus but may also be applied to production on the factory shop floor. The invention therefore extends to apparatus in which the clamp section is mounted on a floor-standing structure. The clamp section is then to be regarded as including the floor-standing structure, on which are also mounted to drive members (as expressed in the opening paragraphs above). Such apparatus may be used in the manufacture of tube platens. In such apparatus the rotary parts including the drive members and welding head may be mounted on the clamp section so as to be displaceable relative to the clamp section transversely to the tubing.

The invention includes apparatus for use in welding tubing oriented other than horizontal, such as for welding vertically extending tubing.

The air motors may be replaced in modifications by electric or hydraulic motors.

The apparatus is applicable to welding of bars or other similar elongate workpieces and the term "tubing" is generic to all such similar workpieces.

The invention is not limited to TIG welding but is applicable generally where wire is required to be fed. For example it is applicable to MIG welding.

What is claimed is:

1. Orbital welding apparatus comprising a main assembly including a support structure carrying first and second rotary drive means and having a generally U-shaped portion comprising two fixed parallel limbs between which a tube to be welded can be received; said support structure also having mounted thereon two clamp jaws and means for operating said jaws, said clamp jaws being relatively movable by said jaw operating means to first relative positions in which a tube to be welded and said support structure can be relatively positioned by relative movement transversely to the length of the tube, said tube entering between said parallel limbs, said clamp jaws being movable by said jaw operating means to second relative positions to grip said tube in position for welding between said parallel limbs; a rotatable assembly carried by said support structure and comprising first and second relatively rotatable gear members rotatable about a common axis, said gear members each being generally of U-shape, said gear members being rotatable into like positions with said U-shape of said support structure in which to receive said tube therein, said first and second gear members being rotationally coupled to said first and second drive means, respectively, said rotatable assembly also comprising arc welding means including wire feed mechanism mounted for rotation with said first gear member, said feed mechanism being operable by relative rotation of said first and second gear members; conductive means for supplying welding current to said arc welding means; and gas duct means for supplying gas to said arc welding means.

2. Orbital welding apparatus according to claim 5, in which said first and second drive means each comprise two synchronously driven gear wheels in driving relationship with the respective gear member so as to ensure continuous drive thereof regardless of its position, and in which said wire feed mechanism is driven by a gear train having two terminal gear wheels at least one of which is in driving relationship with said second gear member.

3. Orbital welding apparatus according to claim 1, and further comprising valve means interconnected with said gas duct means, and a cam follower operatively connected to said valve means, said first gear member having a contoured rotary cam surface engaged by said cam follower and movable thereby to determine alternate positions of said valve means whereby gas is conducted to said arc welding means regardless of the angular position of said rotatable assembly relative to said support structure.

4. Orbital welding apparatus according to claim 1, in which said first gear member has an electrically conductive surface means extending around said member except where interrupted and connected by conductor means to said arc welding means and in which said surface means is engaged by two electrically conductive feeder means mounted on said support structure, said surface, conductor and feeder combining to provide part of said conductive means for supplying welding current to said arc welding means.

* * * * *